(12) United States Patent
Denis

(10) Patent No.: US 9,374,563 B2
(45) Date of Patent: Jun. 21, 2016

(54) MULTISPECTRAL IMAGING CAMERA

(71) Applicant: RAYTHEON COMPANY, Waltham, MA (US)

(72) Inventor: Donald J. Denis, Barrie (CA)

(73) Assignee: Raytheon Company, Waltham, MA (US)

( * ) Notice: Subject to any disclaimer, the term of this patent is extended or adjusted under 35 U.S.C. 154(b) by 342 days.

(21) Appl. No.: 13/665,958

(22) Filed: Nov. 1, 2012

(65) Prior Publication Data

US 2014/0118604 A1    May 1, 2014

(51) Int. Cl.
*G01J 3/28* (2006.01)
*H04N 9/04* (2006.01)
*G01J 3/02* (2006.01)
*H04N 5/225* (2006.01)

(52) U.S. Cl.
CPC . *H04N 9/045* (2013.01); *G01J 3/02* (2013.01); *G01J 3/28* (2013.01); *H04N 5/2254* (2013.01)

(58) Field of Classification Search
CPC ............. G01J 3/02; G01J 3/18; G01J 3/2803; G01J 3/2823; G01J 3/28
USPC .................................................. 356/300–334
See application file for complete search history.

(56) References Cited

U.S. PATENT DOCUMENTS

| | | |
|---|---|---|
| 4,242,706 A | 12/1980 | McCormack et al. |
| 4,617,593 A | 10/1986 | Dudley |
| 5,504,575 A * | 4/1996 | Stafford ......................... 356/330 |
| 5,748,308 A * | 5/1998 | Lindberg et al. ............... 356/310 |
| 2002/0061160 A1* | 5/2002 | Solgaard et al. ................. 385/18 |
| 2002/0176149 A1* | 11/2002 | Davis et al. ..................... 359/290 |
| 2004/0218177 A1* | 11/2004 | MacKinnon et al. .......... 356/326 |
| 2009/0201498 A1 | 8/2009 | Raskar et al. |
| 2010/0149381 A1 | 6/2010 | Motomura et al. |
| 2011/0084717 A1* | 4/2011 | Fong et al. ............... 324/750.01 |

OTHER PUBLICATIONS

Dudley et al., Emerging Digital Micromirror Device (DMD) Applications. Proc. SPIE, vol. 4985, MOEMS Display and Imaging Systems, 14 (Jan. 20, 2003).
Mohan et al., Agile Spectrum Imaging: Programmable Wavelength Modulation for Cameras and Projectors, The Eurographics Association and Blackwell Publishing Ltd., vol. 27, No. 2. (2008).
Web page, "SpectroCam", http://www.spectrocam.com/SpectroCam, printed on Jan. 13, 2012.

* cited by examiner

*Primary Examiner* — Abdullahi Nur
(74) *Attorney, Agent, or Firm* — Burns & Levinson LLP; Joseph M. Maraia

(57) ABSTRACT

One embodiment disclosed is an imaging system that includes a first optical component configured to receive electromagnetic energy associated with an image of an object. The system also includes a second optical component configured to split and diffract the received electromagnetic energy into a plurality of beams of different wavelengths of electromagnetic energy. The system also includes an imaging array configured to receive the plurality of beams and to selectively attenuate one or more of the plurality of beams. The system also includes an imaging detector configured to receive and capture the one or more of the plurality of beams after the beams have been selectively attenuated and recombined and re-focused into a spectrally altered version of the image.

18 Claims, 6 Drawing Sheets

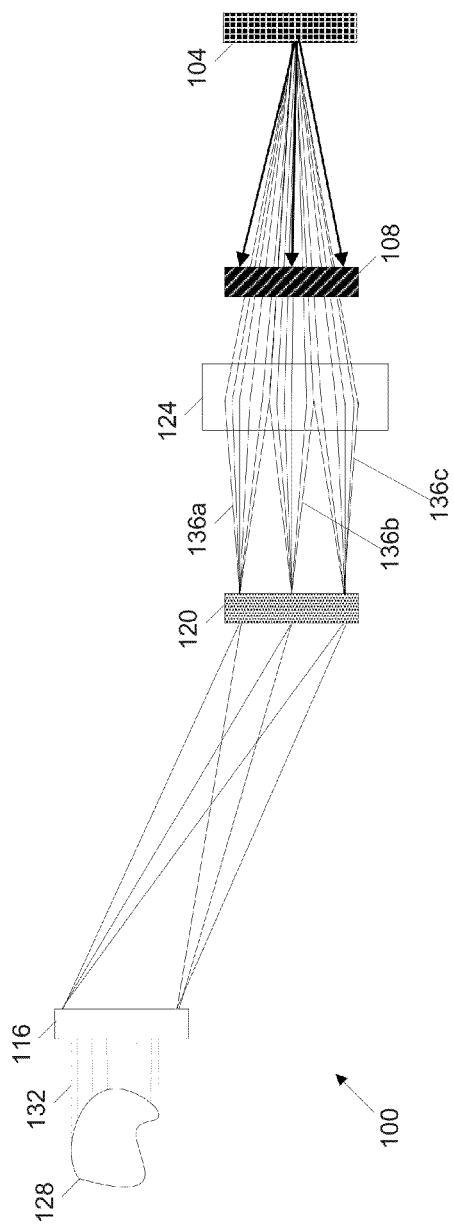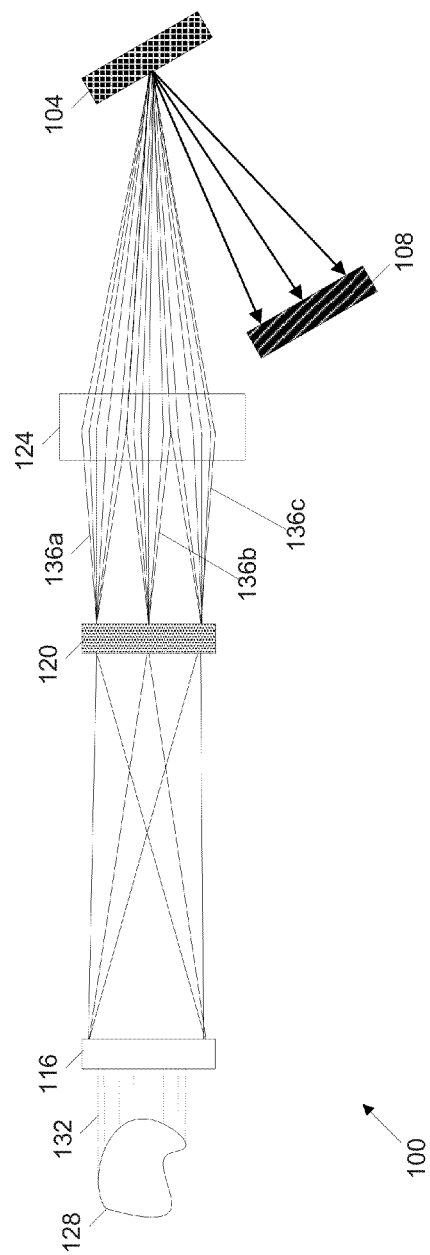
FIG. 1A
FIG. 1B

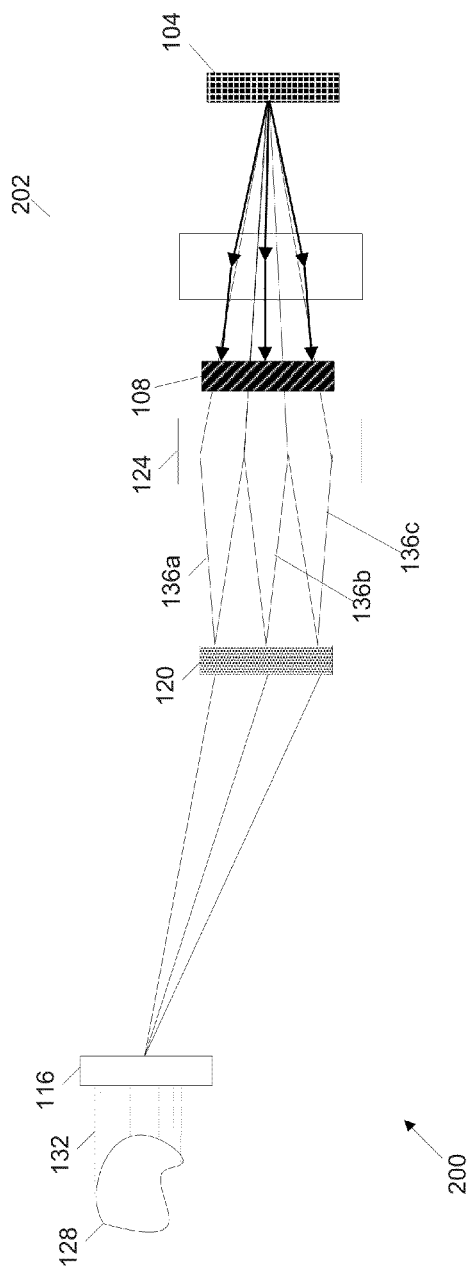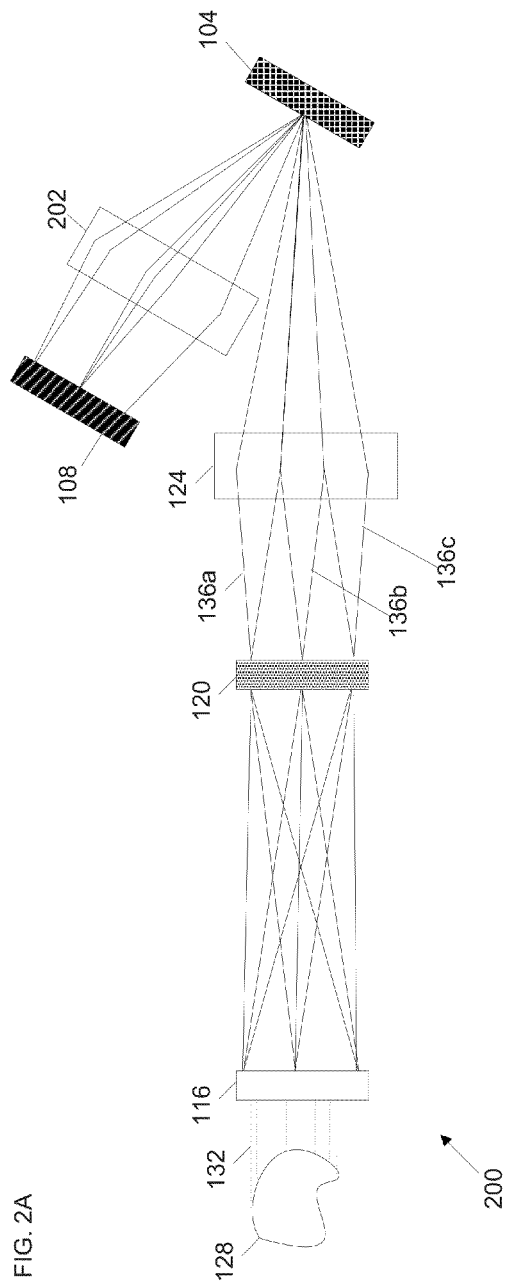
FIG. 2A
FIG. 2B

MULTISPECTRAL IMAGING CAMERA

BACKGROUND

Conventional multispectral imaging systems rely on linear detectors and mirrors or satellite motion to move an image across the sensor to capture and record multispectral images. Systems relying on scanning mirrors require moving parts. Expensive custom filters are used in some systems, but, the properties of the filters are frozen at design time. In addition, some systems require multiple sensors and filters as well as various beam splitters to produce multispectral images. A need therefore exists for improved methods and systems for generating multispectral images.

SUMMARY

One embodiment is an imaging system that includes a first optical component configured to receive electromagnetic energy associated with an image of an object. The imaging system also includes a second optical component configured to split and diffract the received electromagnetic energy into a plurality of beams of different wavelengths of electromagnetic energy. The imaging system also includes an imaging array configured to receive the plurality of beams and to selectively attenuate one or more of the plurality of beams. The imaging system also includes an imaging detector configured to receive and capture the one or more of the plurality of beams after the beams have been selectively attenuated and recombined and re-focused into a spectrally altered version of the image.

In some embodiments, the system includes a third optical component located in the optical path between the second optical component and the imaging array configured to receive the plurality of beams of different wavelengths of electromagnetic energy and direct them to the imaging array. In some embodiments, the system includes a fourth optical component located in the optical path between the imaging array and the imaging detector configured to receive and direct the one or more of the plurality of beams to the imaging detector after they have been selectively attenuated.

In some embodiments, the second optical component includes an optical diffraction grating, a Fresnel lens, or a holographic optical element. In some embodiments, the system includes a processor coupled to the imaging array and imaging detector and a memory coupled to the processor, the memory including code representing instructions that when executed cause the processor to control the operation of the imaging array and the imaging detector.

In some embodiments, the memory includes code representing instructions that when executed cause the processor to control the imaging array to selectively attenuate one or more of the plurality of beams. In some embodiments, the memory includes code representing instructions that when executed cause the processor to command the imaging detector to capture the selectively attenuated one or more of the plurality of beams to acquire a spectrally altered version of the image. In some embodiments, the memory includes code representing instructions that when executed cause the processor to change an attenuation profile for specifying how the one or more of the plurality of beams are selectively attenuated.

In some embodiments, the system includes circuitry that commands the imaging detector to capture the selectively attenuated one or more of the plurality of beams to acquire a spectrally altered version of the image. In some embodiments, the imaging detector includes a charge-coupled or other imaging device.

Another embodiment is a method for generating images. The method includes receiving electromagnetic energy associated with an image. The method also includes splitting and diffracting the received electromagnetic energy into a plurality of beams of different wavelengths of electromagnetic energy. The method also includes selectively attenuating one or more of the plurality of beams to alter the spectral response of the one or more of the plurality of beams. The method also includes capturing the one or more of the plurality of beams, after they have been selectively attenuated and recombined and re-focused, to acquire a spectrally altered version of the image.

In some embodiments, the method includes selectively attenuating one or more of the plurality of beams to block or attenuate one or more of the plurality of beams. In some embodiments, the method includes selectively attenuating one or more of the plurality of beams to alter the magnitude of the electromagnetic energy of each of the one or more plurality of beams. In some embodiments, the method includes displaying the spectrally altered version of the image on a display device.

In some embodiments, the method includes storing data associated with the spectrally altered version of the image on a recording device. In some embodiments, each of the one or more plurality of beams corresponds to a particular wavelength or range of wavelengths of electromagnetic energy. In some embodiments, each of the one or more plurality of beams corresponds to a particular range of visible spectrum wavelengths. In some embodiments, the method includes selectively attenuating one or more of the plurality of beams to filter a particular range in the visible spectrum.

The imaging methods and systems described herein (hereinafter "technology") can provide one or more of the following advantages. One advantage of the technology is that it provides the ability to control the spectral response of the imaging system in real-time. The technology is able to achieve red, green, blue (RGB) and non-RGB color space images. In addition, the technology can also generate hyperspectral images that reach into near-UV and near-IR wavelengths. The technology also has the advantage that it can blend multiple images (e.g., having different spectral response properties) using appropriately shaped spectral responses to display image details normally invisible to the human eye or to conventional cameras.

Other aspects and advantages of the current invention will become apparent from the following detailed description, taken in conjunction with the accompanying drawings, illustrating the principles of the invention by way of example only.

BRIEF DESCRIPTION OF THE DRAWINGS

The foregoing features of various embodiments of the invention will be more readily understood by reference to the following detailed descriptions in the accompanying drawings.

FIGS. 1A and 1B are schematic illustrations of an imaging system, according to an illustrative embodiment.

FIGS. 2A and 2B are schematic illustrations of an imaging system, according to another illustrative embodiment.

DETAILED DESCRIPTION OF ILLUSTRATIVE EMBODIMENTS

Figure 3:
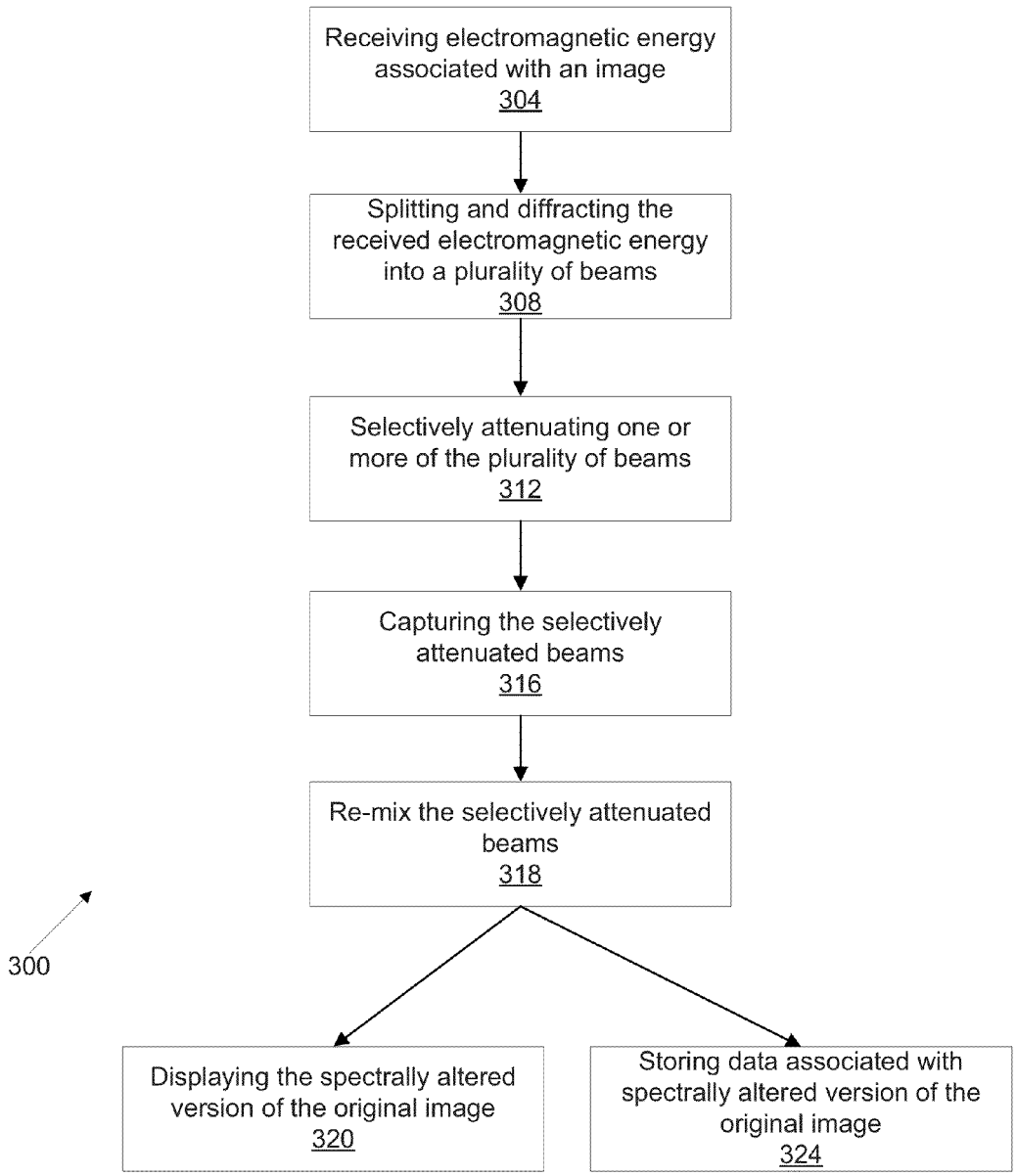
FIG. 3 is a flowchart of a method for generating images, according to an illustrative embodiment.

FIGS. 1A and 1B are schematic illustrations of an imaging system 100, according to an illustrative embodiment. FIG. 1A is a top view of the system 100 and FIG. 1B is a side view of the system 100. In this embodiment, the system 100 includes a plurality of components, including, an imaging array 104, an imaging detector 108, and three optical components 116, 120, and 124 used to image an object 128. In this embodiment, the first optical component 116 is a lens, the second optical component 120 is a diffraction grating, and the third optical component 124 is another lens. The diffraction grating 120 is located in the optical path between the first lens element 116 and the second lens element 124. The front-end optics (path from optical component 116 to the diffraction grating 120) of the system 100 are not on-axis. The back-end optics (path from the diffraction grating 120 to the imaging detector 108) of the system 100 also are not on-axis.

Electromagnetic energy 132 (e.g., light or infrared energy) emitted by the object 128 is directed towards the lens 116. The lens 116 receives the electromagnetic energy 132 and focuses the energy 132 on the diffraction grating 120. The diffraction grating 120 splits and diffracts the received electromagnetic energy into a plurality of beams 136a, 136b, 136c, . . . (generally 136) of different wavelengths of electromagnetic energy (e.g., infrared, ultraviolet, visible). In the context of the visible portion of the electromagnetic spectrum (about 400-700 nm), the diffraction grating 120 breaks up the electromagnetic energy 132 into its constituent colors, with each of the beams corresponding to a specific color or color range. For example, violet has a wavelength of about 400 nm and indigo has a wavelength of about 450 nm. A color range could be set for one of the beams to be a range of 400 nm to 450 nm. The directions the beams take after diffraction depend on the spacing of the grating and the wavelength of the electromagnetic energy received so that the grating acts as a dispersive element. The diffraction grating could be either a transmissive grating or reflective grating. A transmissive grating diffracts the electromagnetic energy as the energy passes through the grating. A reflective grating diffracts the electromagnetic energy as the energy is reflected off of the surface of the grating. The plurality of beams 136 are then directed to the second lens 124.

The second optical component can be any one of a variety of optical components that are configured to split and diffract the received electromagnetic energy. In some embodiments, the second optical component is an optical diffraction grating, a Fresnel lens, or a holographic optical element.

The second lens 124 receives the plurality of beams 136 and directs them to the imaging array 104. The imaging array 104 is configured to selectively attenuate one or more of the plurality of beams 136 as the beams are received by the imaging array 104. By selectively attenuating the beams, the imaging array 104 is able to effectively filter particular wavelengths of energy. The imaging array 104 can be configured as, for example, a linear array or planar array.

In one embodiment, the imaging array 104 is a micromirror imaging array that includes a plurality of micromirrors. The micromirrors can be individually articulated/rotated. In an on-state, the mirrors are commanded to a position that reflects incoming electromagnetic energy to the imaging detector 108. In an off-state, the electromagnetic energy is blocked by commanding the mirrors to a position that reflects the plurality of beams 136 to a location other than where the imaging detector 108 would be able to receive the selectively attenuated, reflected plurality of beams 136. The imaging array 104 can be operated to reflect one or more of the plurality of beams, or block one or more of the plurality of beams. Micromirrors are positioned at some angle relative to the optical axis in order to reflect the light back to the image. This means the aperture image formed on the micromirror will be at a less than perfect focus away from its center. A slow lens used as lens element 116 has a larger depth of focus to help reduce the out of focus effects. By comparison, a transmission LCD used as the imaging array (see below) does not need to reflect light, so, it can be mounted perpendicularly to the optical axis and not suffer from the same de-focusing. In some embodiments, the imaging array 104 does not completely block a beam. For example, a single mirror can effectively attenuate a single beam to 50% of its maximum energy level by commanding the mirror to reflect the beam for 50% of the total time for an imaging cycle. The DLP5500 Digital Micromirror Device is an exemplary micromirror that can be used; it is a digitally controlled micro-opto-electromechanical system spatial light modulator, sold by Texas Instruments.

In some embodiments, the imaging array 104 is instead an LCD or other array that receives the plurality of beams and can be commanded to selectively attenuate one or more of the plurality of beams. The plurality of beams are transmitted through an LCD array, and the LCD array attenuates one or more of the beams as they are transmitted through the array.

The beams transmitted to the imaging detector 108 are received by the imaging detector 108 after the beams have been selectively attenuated, producing a spectrally modified image of the image. The imaging detector 108 captures the beams and recombines them into a spectrally altered version of the original image. A charge-coupled device (CCD) array is one type of imaging sensor that can be used. When electromagnetic energy (e.g., light) strikes the CCD array, the array elements maintain the energy as discrete electrical charges. The electrical charge is converted to a voltage and then subsequently to a digital signal. The digital signal corresponds to the spectrally altered version of the original image and can be, for example, displayed or stored for subsequent processing such as recombining/re-mixing multiple channels of altered images into RGB or other color-space displays. RGB displays are not limited to 3 color channels. Rather, any number of channels can be mathematically blended for display.

In some embodiments, the attenuated beams are refocused by an additional optical element prior to being directed to the imaging detector 108. FIGS. 2A and 2B illustrate an embodiment of an imaging system 200 that includes an additional lens 202 that receives the selectively attenuated beams and focuses the beams onto the imaging detector 108. FIG. 2A is a top view of the system 200 and FIG. 2B is a side view of the system 200. The front-end optics (path from optical component 116 to the diffraction grating 120) of the system 100 are on-axis (as depicted by FIG. 2B). The back-end optics (path from the diffraction grating 120 to the imaging detector 108) of the system 100 are not on-axis. The additional lens 202 permits on-axis optics to be used for the front-end optics. The additional lens compensates for aberrations or distortions in the transmitted images that would otherwise occur due to the front-end on-axis optics.

FIG. 3 is a flowchart 300 of a method for generating images using, for example, the imaging system 100 of FIGS. 1A and 1B. Electromagnetic energy (e.g., light or infrared energy) emitted by an object is directed towards the lens 116. The lens 116 receives (304) the electromagnetic energy and focuses the energy on the diffraction grating 120 where the energy is split and diffracted (308) into a plurality of beams of different wavelengths of electromagnetic energy. The plurality of beams then pass through a second lens 124, and the lens 124 focuses the plurality of beams on to the imaging array 104.

Figure 4A:
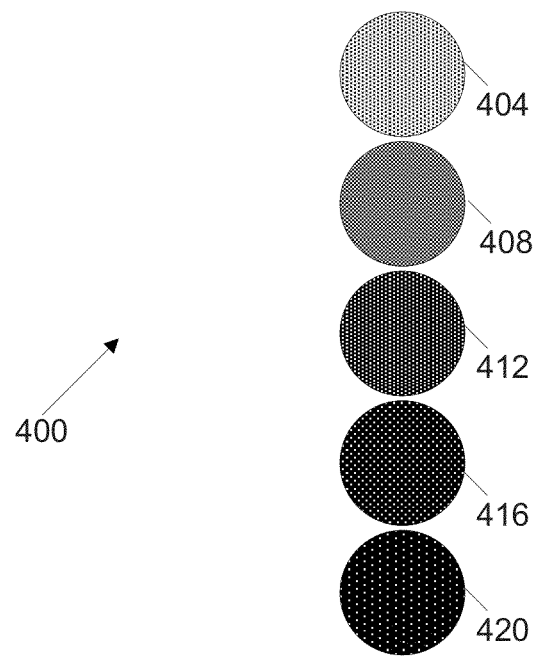
FIG. 4A is an exemplary illustration of beams of electromagnetic energy focused on to an imaging array representing spectrally shifted aperture images, according to an illustrative embodiment.

FIG. 4A is a exemplary schematic illustration 400 of the plurality of beams focused on the imaging array 104. In this exemplary illustration, the diffraction grating 120 breaks up the energy into 5 beams 404, 408, 412, 416, and 420. Each beam corresponds to a continuum of wavelengths of electromagnetic energy; for example, the top of beam 404 is 400 nm and the bottom of beam 404 is 450 nm, the top of beam 408 is 450 nm and the bottom of beam 408 is 500 nm, the top of beam 412 is 500 nm and the bottom of beam 412 is 550 nm, the top of beam 416 is 550 nm and the bottom of beam 416 is 600 nm, and the top of beam 420 is 600 nm and the bottom of beam 420 is 650 nm. The imaging array 104 is used to selectively attenuate (312) one or more of the plurality of beams (or portions of a given beam). The spectral response of a beam is altered by attenuating the beam. For example, if the imaging array 104 completely attenuates beam 416, the 550 nm-600 nm bandwidth of electromagnetic energy is filtered out. An operator can specify how the imaging array 104 is to attenuate the one or more beams. Alternatively, the system can store one or more attenuation profiles that are used by the system to command the imaging array 104 to selectively attenuate the beams based on the specifications of the profile.

A micromirror array, for example, can be used to selectively attenuate the beams. Individual beams can be directed to specific mirror elements in the micromirror array. The mirror elements are individually controlled to affect whether or not, and how, the beams are attenuated. In one example, a mirror element associated with a particular band of electromagnetic energy is commanded to attenuate (e.g., partially or completely) that particular band. In this manner, the spectral response of the beams is altered because one particular band is removed.

Tables 1, 2 and 3 illustrate exemplary profiles for selectively attenuating the plurality of beams. Profile A of Table 1 attenuates beam 416 but does not attenuate the other beams during an image acquisition cycle of the system. Profile B of Table 2 attenuates 30% of the magnitude of beam 408 and 100% of the magnitude of beam 416, but does not attenuate beams 404, 412 or 420 during an image acquisition cycle of the system. Profile C of Table 3 attenuates 30% of the magnitude of beam 408 for 50% of the image acquisition cycle, attenuates 100% of the magnitude of beam 426 for 100% of the image acquisition cycle, but, does not attenuate beams 404, 412 or 420. By selectively attenuating the beams for different durations of time, it is possible apply the attenuation with a temporal component.

TABLE 1

| Profile A | | |
|---|---|---|
| Profile Entry | Beam number | Attenuation |
| P0 | Beam 404 | No |
| P1 | Beam 408 | No |
| P2 | Beam 412 | No |

TABLE 1-continued

| Profile A | | |
|---|---|---|
| Profile Entry | Beam number | Attenuation |
| P3 | Beam 416 | Yes |
| P4 | Beam 420 | No |

TABLE 2

| Profile B | | |
|---|---|---|
| Profile Entry | Beam number | Attenuation |
| P0 | Beam 404 | 0% |
| P1 | Beam 408 | 30% |
| P2 | Beam 412 | 0% |
| P3 | Beam 416 | 100% |
| P4 | Beam 420 | 0% |

TABLE 3

| Profile C | | |
|---|---|---|
| Profile Entry | Beam number | Attenuation (Magnitude)/(Temporal Component) |
| P0 | Beam 404 | (0%)/(100%) |
| P1 | Beam 408 | (30%)/(50%) |
| P2 | Beam 412 | (0%)/(100%) |
| P3 | Beam 416 | (100%)/(100%) |
| P4 | Beam 420 | (0%)/(100%) |

Figure 4B:
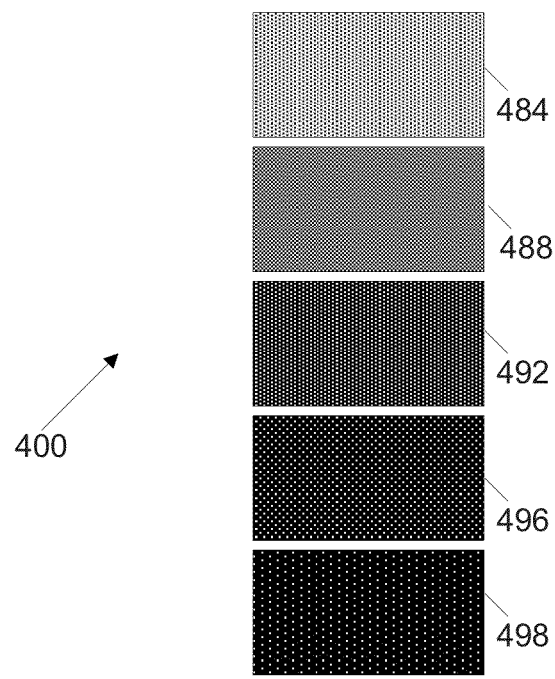
FIG. 4B is an exemplary illustration of beams of electromagnetic energy focused on to an imaging array representing spectrally shifted aperture images, according to an illustrative embodiment.

FIG. 4B is a exemplary schematic illustration 480 of the plurality of beams focused on the imaging array 104. A rectangular aperture is used as the objective lens of the system (e.g., first optical component 116 of FIG. 1A). In this exemplary illustration, the diffraction grating 120 breaks up the energy into 5 beams 484, 488, 492, 496, and 498. The rectangular aperture permits more light to enter the system than the circular aperture used with respect to FIG. 4A. Alternative aperture geometries (e.g., elliptical, square) can be used in other embodiments. Each beam corresponds to a continuum of wavelengths of electromagnetic energy; for example, the top of beam 484 is 400 nm and the bottom of beam 484 is 450 nm, the top of beam 488 is 450 nm and the bottom of beam 488 is 500 nm, the top of beam 492 is 500 nm and the bottom of beam 492 is 550 nm, the top of beam 496 is 550 nm and the bottom of beam 496 is 600 nm, and the top of beam 498 is 600 nm and the bottom of beam 498 is 650 nm.

One skilled in the art will appreciate that other attenuation profiles can be applied to satisfy the performance required for a particular application. Alternative attenuation profiles can be specified by an operator or a processor of the system depending on, for example, the type of image (e.g., whether the image is of a person, building or vehicle), imaging conditions (e.g., low light conditions, bright light conditions, nighttime, obscuring conditions such as rain, cloud, fog, smoke or snow), or the environment (e.g., in a building, in a wooded area, in the sky, at sea) in which the object being imaged is located. For example, if the object being imaged is anticipated (or determined) to be located surrounded by green foliage, it may be desirable to use an attenuation profile that attenuates electromagnetic energy in the visible spectrum associated with the color green to increase the contrast between the object and its surroundings. By attenuating electromagnetic energy associated with the color green, the image will be spectrally altered such that the green associate foliage will be attenuated, thereby allowing an operator to more readily identify the object which might otherwise be obscured by the green foliage even as it appears to be perfectly camouflaged to the eye.

Figure 4C:
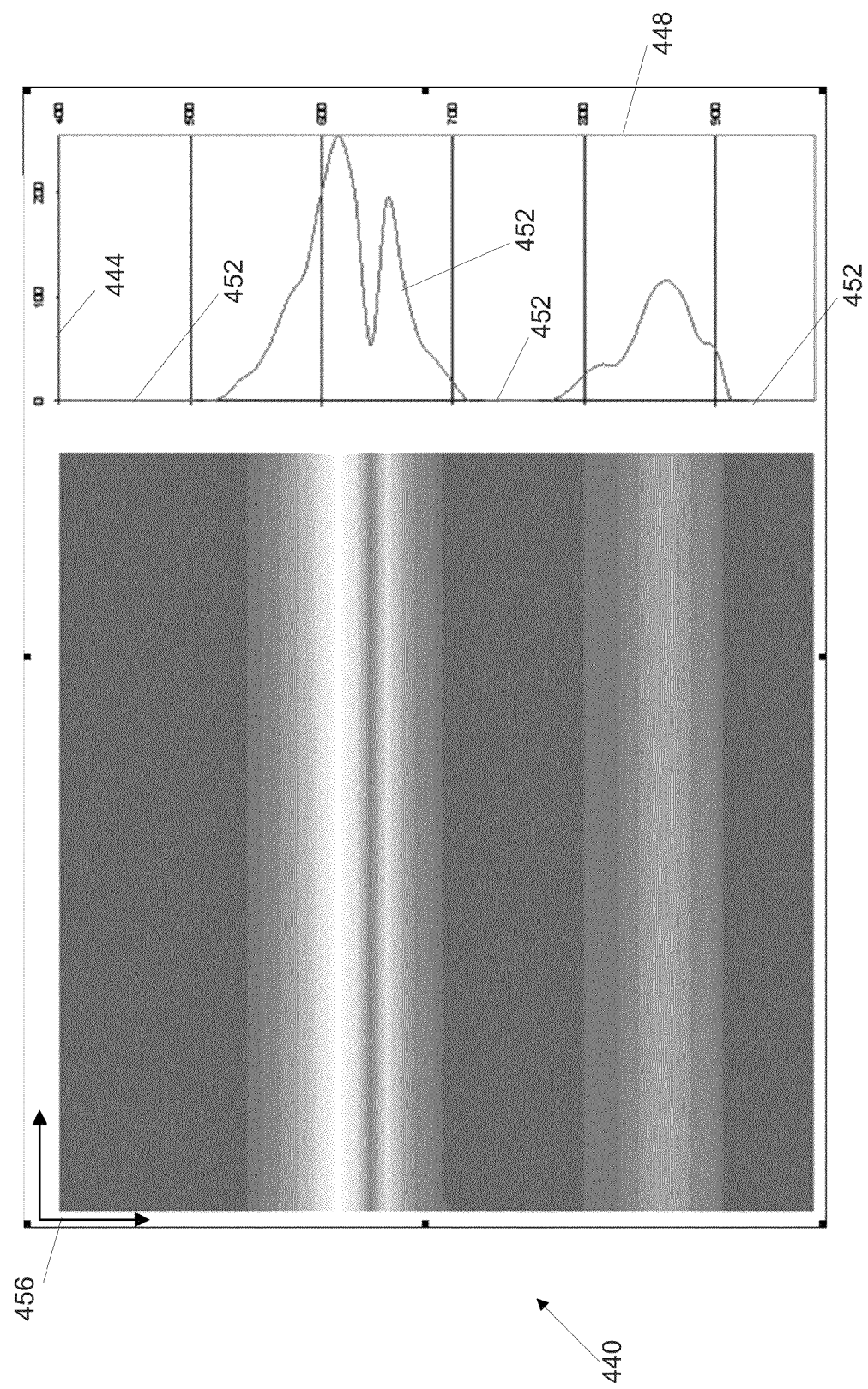
FIG. 4C is a plot of an exemplary attenuation profile, according to an illustrative embodiment.

In addition, while Tables 1, 2 and 3 illustrate attenuation profiles that operate on discrete bandwidths of electromagnetic energy, other profiles can also be applied in alternative embodiments. For example, profiles can be applied that are specified by a mathematical relationship or equation (e.g., attenuation over a range of electromagnetic energy wavelengths that increases or decreases in a linear or quadratic manner from the lowest frequency to the highest frequency). In addition, complex curves can be used to specify an attenuation profile. FIG. 4C is a plot of an exemplary of an attenuation profile that is defined by a curve 452. Axis 444 is the magnitude of the attenuation profile with a range of 0 to 255 (from left to right in the image) for an 8 bit digital micromirror device. In this embodiment, a value of 0 on axis 444 corresponds to 100% attenuation and a value of 255 corresponds to 0% attenuation. Axis 448 is the wavelength of the attenuation profile with a range of 400 nm to 1000 nm (from top to bottom in the image). Pattern 456 illustrates a grey scale plot of the attenuation profile defined by the curve 452 where axis 456 is the attenuation profile on the surface (in the X-Y plane) of the digital micromirror device array. Alternative profiles can be defined for use in different applications.

After the imaging array attenuates the beams, the electromagnetic energy is refocused and directed towards the imaging detector 108 where it is captured (316), thereby enabling the system to acquire a spectrally altered version of the original image of the object 128. The selectively attenuated beams are then re-mixed or otherwise combined (318) to produce the desired spectrally altered image (e.g., RGB, CMY, RGBY or other color-space display scheme). The spectrally altered version of the image can be, for example displayed (320) for viewing by an operator. In another embodiment, the data associated with the spectrally altered version of the image is alternatively or, also, stored (324) for subsequent viewing and/or processing using, for example, the computing device 502 of FIG. 5.

Figure 5:
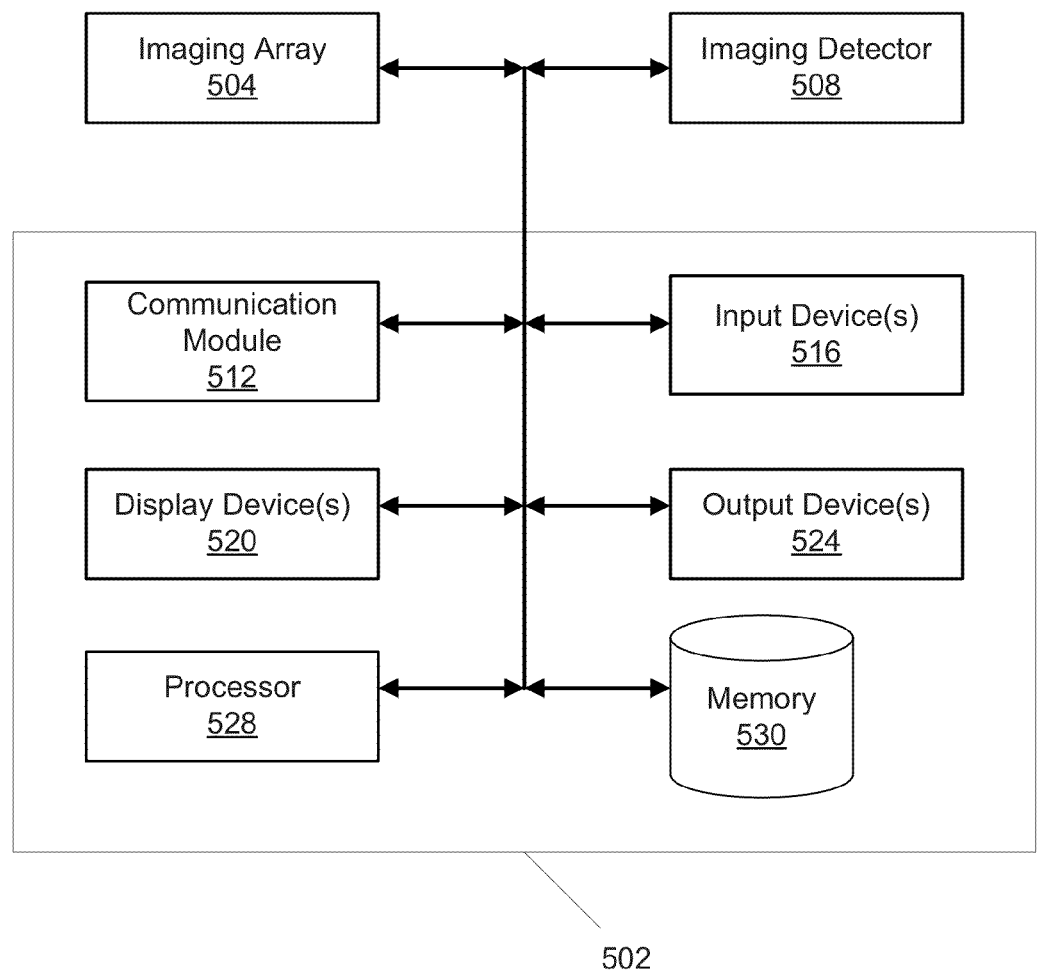
FIG. 5 is a schematic illustration of a computing device for operating an imaging system, according to an illustrative embodiment.

FIG. 5 is a schematic illustration 500 of a computing device 502 for operating an imaging system (e.g., the imaging system 100 of FIGS. 1A and 1B). The computing device 502 includes one or more input devices 516, one or more output devices 524, one or more display devices(s) 520, a processor 528, memory 530, and a communication module 512. The modules and devices described herein can, for example, utilize the processor 528 to execute computer executable instructions and/or the modules and devices described herein can, for example, include their own processor to execute computer executable instructions. It should be understood the computing device 502 can include, for example, other modules, devices, and/or processors known in the art and/or varieties of the described modules, devices, and/or processors.

The communication module 512 includes circuitry and code corresponding to computer instructions that enable the computing device to send/receive signals to/from the imaging array 505 (e.g., imaging array 104 of FIGS. 1A and 1B) and the imaging detector 508 (e.g., imaging detector 108 of FIGS. 1A and 1B). For example, the communication module 512 provides commands from the processor 528 to the imaging array 504 to control how the imaging array selectively attenuates electromagnetic energy that is received by the imaging array 504 during operation. The communication module 512 also, for example, receives data corresponding to the spectrally altered version of the image which can be stored by the memory 530 or otherwise processed by the processor 528.

The input devices 516 receive information from a user (not shown) and/or another computing system (not shown). The input devices 510 can include, for example, a keyboard, a scanner, a microphone, a stylus, a touch sensitive pad or display. The output devices 514 output information associated with the computing device 502 (e.g., information to a printer, information to a speaker, information to a display, for example, graphical representations of information). The processor 528 executes the operating system and/or any other computer executable instructions for the computing device 502 (e.g., executes applications). The memory 530 stores a variety of information/data, including profiles used by the computing device 502 to specify how the imaging array should selectively attenuate one or more of the plurality of electromagnetic beams received from the diffraction grating or data associated with the spectrally altered version of the image. The memory 530 can include, for example, long-term storage, such as a hard drive, a tape storage device, or flash memory; short-term storage, such as a random access memory, or a graphics memory; and/or any other type of computer readable storage.

The above-described systems and methods can be implemented in digital electronic circuitry, in computer hardware, firmware, and/or software. The implementation can be as a computer program product that is tangibly embodied in an information carrier. The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors, or one or more servers that include one or more processors, that execute a computer program to perform functions of the disclosure by operating on input data and generating output. Method steps can also be performed by, and an apparatus can be implemented as, special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data. Magnetic, magneto-optical disks, or optical disks are examples of such storage devices.

Data transmission and instructions can occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. An imaging camera system, comprising:
   a first optical component configured to receive electromagnetic energy associated with an original image of an external-to-the-camera object and emitted or reflected therefrom;
   a second optical component configured to split and diffract the received electromagnetic energy into a plurality of spectrally altered beamed images of different wavelengths of electromagnetic energy;
   an imaging array configured to receive the plurality of beamed images and to selectively and transmissively attenuate one or more beamed images of said plurality of beamed images; and
   an imaging detector configured to receive and capture a plurality of the beamed images after one or more of the beamed images have been selectively attenuated and the one or more attenuated beamed images and the one or more non-attenuated beamed images are recombined and re-focused into a spectrally altered version of the original image.

2. The system of claim 1, comprising a third optical component located in the optical path between the second optical component and the imaging array configured to receive said plurality of beamed images of different wavelengths of electromagnetic energy and direct them to the imaging array.

3. The system of claim 2, comprising a fourth optical component located in the optical path between the imaging array and the imaging detector configured to receive and direct the one or more of said plurality of beamed images to the imaging detector after they have been selectively attenuated.

4. The system of claim 2, wherein the second optical component includes an optical diffraction grating, a Fresnel lens, or a holographic optical element.

5. The system of claim 2, comprising:
   a processor coupled to the imaging array and imaging detector; and
   a memory coupled to the processor, the memory including code representing instructions that when executed cause the processor to control the operation of the imaging array and the imaging detector.

6. The system of claim 5, wherein the memory includes code representing instructions that when executed cause the processor to control the imaging array to selectively attenuate one or more of said plurality of beamed images.

7. The system of claim 5, wherein the memory includes code representing instructions that when executed cause the processor to control the imaging detector to capture the selectively attenuated one or more beamed images of the plurality of beamed images to acquire a spectrally altered version of the image.

8. The system of claim 7, wherein the memory includes code representing instructions that when executed cause the processor to change an attenuation profile for specifying how the one or more of the plurality of said beamed images are selectively attenuated.

9. The system of claim 2, comprising circuitry that controls the imaging detector to capture the selectively attenuated one or more beamed images of the plurality of beams to acquire a spectrally altered version of the image.

10. The system of claim 1, wherein the imaging detector comprise a charge-coupled or other imaging device.

11. A method for generating images, the method comprising:
    receiving electromagnetic energy associated with an original image in a camera, with a front end receiving lens to focus on electromagnetic energy received from an object that is external-to-the-camera;
    splitting and diffracting the received electromagnetic energy into a plurality beamed images of different wavelengths of electromagnetic energy;
    selectively and transmissively attenuating one or more of the plurality of beamed images to alter the spectral response of the one or more of the plurality of beamed images; and
    capturing the one or more of the plurality of beamed images, after they have been selectively attenuated and recombined and re-focused, to acquire a spectrally altered version of the image.

12. The method of claim 11, comprising selectively attenuating one or more of the plurality of beamed images to block or attenuate one or more of the plurality of beamed images.

13. The method of claim 11, comprising selectively attenuating one or more of said plurality of beamed images to alter the magnitude of the electromagnetic energy of each of the one or more plurality of beamed images.

14. The method of claim 11, comprising displaying the spectrally altered version of the image on a display device.

15. The method of claim 11, comprising storing data associated with the spectrally altered version of the original image on a recording device.

16. The method of claim 11, wherein each of the one or more plurality of beamed images corresponds to a particular wavelength or range of wavelengths of electromagnetic energy.

17. The method of claim 16, wherein each of the one or more plurality of beamed images corresponds to a particular range of visible spectrum wavelengths.

18. The method of claim 17, comprising selectively attenuating one or more of the plurality of beamed images to filter a particular range in the visible spectrum.

* * * * *